(No Model.)
G. BANISTER.
SPRING FOR VEHICLES.
No. 336,543. Patented Feb. 23, 1886.
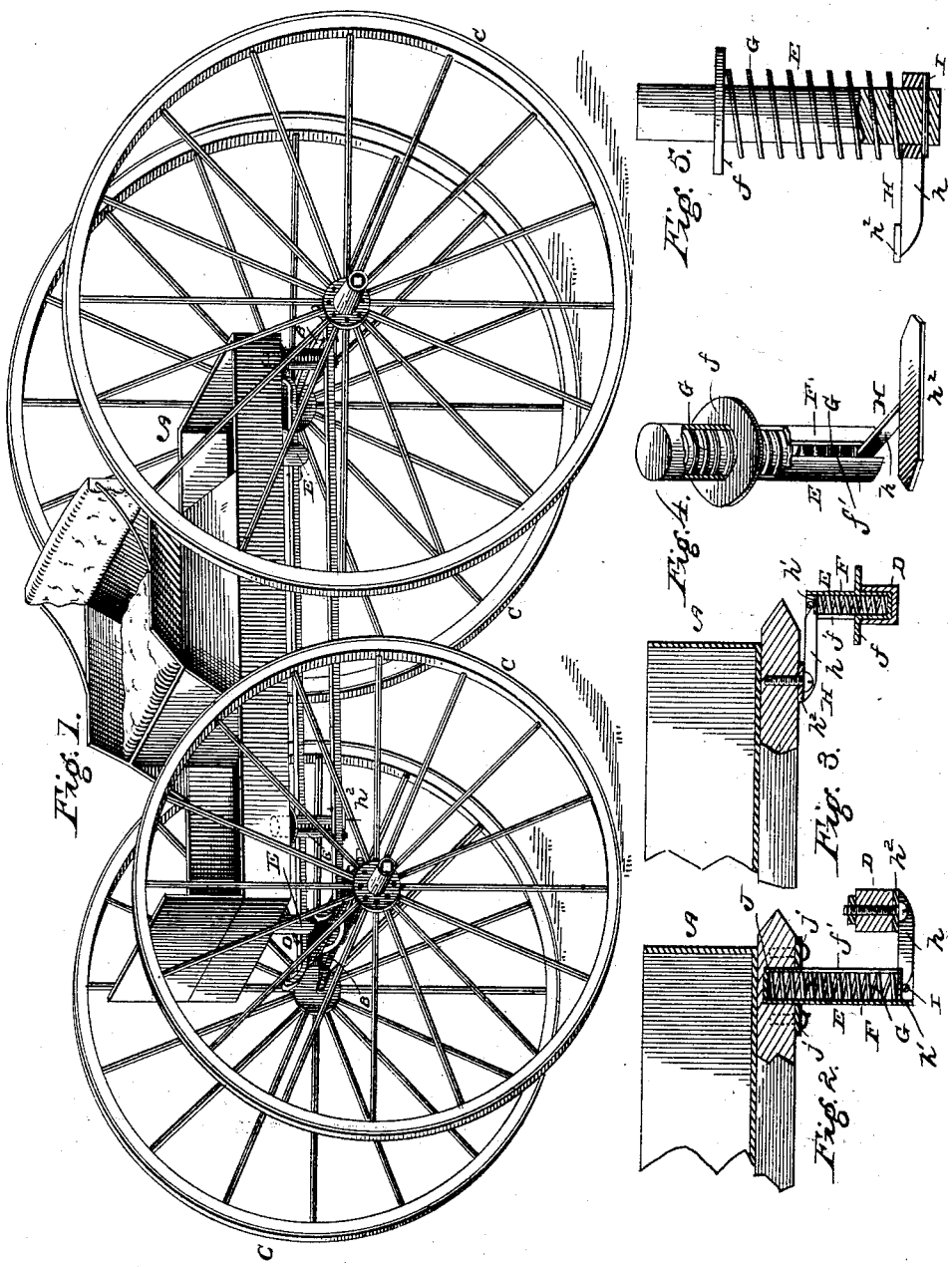

ered to in the manner of a specification.

UNITED STATES PATENT OFFICE.

GEORGE BANISTER, OF WARREN, VERMONT.

SPRING FOR VEHICLES.

SPECIFICATION forming part of Letters Patent No. 336,543, dated February 23, 1886.

Application filed October 10, 1885. Serial No. 179,553. (No model.)

*To all whom it may concern:*

Be it known that I, GEORGE BANISTER, a citizen of the United States, residing at Warren, in the county of Washington and State of Vermont, have invented a new and useful Improvement in Springs for Vehicles, of which the following is a specification, reference being had to the accompanying drawings.

My invention has relation to improvements in springs for vehicles; and the novelty consists in the peculiar construction, combination, arrangement, and adaptation of the various parts for service, substantially as hereinafter fully set forth, and particularly pointed out in the claim.

It is the object of my invention to provide a spring to vehicles of the buggy or wagon class which shall possess the required degree of elasticity to give an easy and resilient motion to the body of the vehicle, which shall be capable of ready attachment to and removal from the body and running-gear thereof in case of breakage or when the parts shall have become worn out through usage, and which shall combine simplicity, strength, and durability of construction with thorough effectiveness of operation and cheapness of manufacture.

In the accompanying drawings, Figure 1 is a perspective view of a vehicle having my improved springs applied thereto. Fig. 2 is a vertical sectional view showing a portion of the vehicle-body and the running-gear and the manner of connecting my improvement thereto. Fig. 3 is a similar sectional view to Fig. 2, the spring and its inclosing-case being reversed. Fig. 4 is a detailed perspective view, partly in section. Fig. 5 is a view of a modification.

Like letters of reference denote corresponding parts in all the figures of the drawings, referring to which—

A designates the body of a vehicle; B, the axles thereof; C, the wheels mounted on the axles, and D the running-gear, consisting, in the present instance, of two parallel bars arranged beneath and on each side of the vehicle-body, and connecting the front and rear axles together.

E designates my improved spring, one of which, in a vehicle of the class shown, is secured at or near each corner thereof in the manner presently described, and connected or secured at its lower end to one end of the parallel bars D.

The improved spring comprises a casing, F, preferably hollow and cylindrical in form, and having a flange, $f$, near one end thereof, and a longitudinal slot, $f'$, cut or formed in one of its vertical faces, a coiled or spiral spring, G, arranged within said cylindrical shell or casing, and bearing in one of the end walls or head thereof, a bracket, H, having a shank, $h$, and a head, $h'$, arranged in the slot $f'$ and interior of the cylindrical shell or casing, and free to slide vertically therein, the outer end of the shank $h$ thereof having lateral arms or a cross-bar, $h^2$, formed integral therewith or rigidly secured thereto in any suitable manner, and a cross-bar, I, of any suitable construction or form, arranged transversely across the open mouth of the cylindrical shell or casing and bearing in the walls thereof, to prevent the bracket and spring from displacement from the shell or casing.

Any suitable devices or means may be substituted for the cross-bar I to hold the bracket and spring within the shell, and I would therefore have it understood that I do not desire to limit myself to employing such bar.

When the device is secured to the vehicle in the manner shown in Figs. 1 and 2, a socket or opening, J, is cut or formed in or near each corner of the vehicle-body sills, and the upper closed end of the cylindrical shell or casing is fitted therein until the flange $f$ thereof abuts against the lower face of such vehicle-body, and is secured thereto by bolts, screws, or other suitable fastening devices, as indicated at $j$. When the shell is thus secured to the vehicle-body, the bracket H thereof is secured to one end of one of the cross-bars D by clips or bolts engaging or passing through the lateral arms $h^2$ thereof, and in this manner all of the four springs—one at each corner—are secured to the vehicle, to give an easy and resilient motion thereto.

When the device is secured to the vehicle in the manner shown in Fig. 3, the cylindrical shell or casing is reversed, end for end, thus causing the bracket H to bear or abut against the lower face of the vehicle-body and the closed end and flange of said casing to bear against the bars D, and when in this position the parts are secured in a similar manner to the said body and bars—that is to say, the bars D are provided with the sockets J, to provide a seat for the closed end of the casing and the flange or seat $f$ thereof, and the arms $h^2$ of the bracket are bolted or clipped to the body of the vehicle.

The stem and arms $h^2$ of the bracket H are arranged out of the line of movement of the cylindrical shell, which moves in a vertical plane when any undue weight is imposed upon the corner or end of the vehicle-body to which it is attached, and compresses the coiled spring arranged within the same. The bracket and the stem thereof serve to guide said shell or casing in its vertical movements, and prevent the same from having lateral sidewise movement.

The operation of my invention is obvious from the foregoing description, taken in connection with the drawings. The springs in each case are of the same size and the same power, and when they and their casings and brackets are properly secured to the vehicle-body and running-gear they maintain the said body normally in a horizontal plane or level position.

Under the weight of the driver and a load in the body thereof the shells or casings descend, when the device is used in the form shown in Figs. 1 and 2, and compress the springs therein, to give an easy and resilient movement to the vehicle-body and obviate or prevent any sudden shocks or jars thereto; but when the device is used or secured to the body and running-gear in the form shown in Fig. 3, the shells or casings being rigidly secured and maintained in a vertical position, the bracket descends with the body and compresses said springs, thus securing the desired results in both instances—namely, an easy resilient motion of the vehicle-body.

In lieu of the cylindrical shell or casing, a guide bar or rod may be employed, and the spring coiled or wound thereon exteriorily thereto, and in such construction a ring or sleeve is secured to the shank of the bracket, to fit over said rod or bar and bear against the spring, in lieu of the solid head $h'$ of said bracket, the cross-bar I and flange $f$ being employed, as before, to hold the sleeve of the bracket and coiled spring from disengagement with said guide bar or rod. The operation of this construction is similar to that of the device shown in the figures of the drawings; but I prefer to employ the inclosing shell or casing, as thereby all dust and other matter is prevented from accumulating on the springs, and they are guided thereby and rendered more durable and efficient.

The guide bar or rod may be made hollow or solid and cylindrical or of other suitable form.

If preferred, a pad of any suitable material may be fitted over the cylindrical shell and interposed between the flange $f$ and the vehicle-body or running-gear.

From the foregoing description, taken in connection with the drawings, it will be observed that I provide a vehicle-spring which is simple, strong and durable in its construction, which can be readily detached and removed to replace the parts when broken or worn out through usage, which is thoroughly effective and automatic in operation, cheap and easy of manufacture, and can be applied to vehicles of different constructions and at present in use with little additional cost.

If desired, the shell or guide-bar may be formed with or secured to the angle-iron at the corner of the vehicle-body.

In order to define the nature and scope of my invention, I would state that heretofore it has been proposed to provide a slotted shell having a spring and an arm working therein; also that the shell has been suspended from the body of the vehicle.

In my improved device I provide the shell with an annular flange arranged at a distance below its upper end, and fit the said upper end in a socket in the vehicle-body, so that the flange thereof bears against the lower face of the body and is bolted thereto, thus providing means for securely connecting the shell to the body without liability of any play or movement and of easy detachment. The shank of the bracket has two lateral arms, to provide secure means for bolting the same to the running-gear, and the head thereof bears against the spring and is retained in place by a removable pin or bolt that is secured in the open mouth of the casing. By removing this pin or bolt the head of the shank can be readily removed to take out the spring to renew or repair the same when it shall have become useless through usage or broken.

Having thus fully described my invention, what I claim as new, and desire to secure by Letters Patent, is—

The combination, with the vehicle-body and the running-gear thereof, of a longitudinally-slotted shell seated in a socket in each corner of the body, and having an annular flange bearing against the lower face thereof, bolts or screws passing through the flange to secure the shell to the body, a coiled spring seated in the shell, a bracket having a head arranged within the shell and bearing on the spring, and a shank projecting through the slot beyond the line of movement of the body and provided with two lateral arms bolted to the running-gear, and a cross pin or bolt removably secured in the open mouth of the shell, to retain the bracket-head and spring therein, all arranged and combined substantially as described.

In testimony that I claim the foregoing as my own I have hereto affixed my signature in presence of two witnesses.

GEORGE BANISTER.

Witnesses:
DON CARLOS GEER,
HATTIE MELINDA GEER.